(12) United States Patent
Fornage

(10) Patent No.: US 7,925,459 B2
(45) Date of Patent: Apr. 12, 2011

(54) METHOD AND APPARATUS FOR DETERMINING AN OPERATING VOLTAGE FOR PREVENTING PHOTOVOLTAIC CELL REVERSE BREAKDOWN DURING POWER CONVERSION

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 11 days.

(21) Appl. No.: 12/589,025

(22) Filed: Oct. 16, 2009

(65) Prior Publication Data

US 2010/0106438 A1   Apr. 29, 2010

Related U.S. Application Data

(60) Provisional application No. 61/196,253, filed on Oct. 16, 2008.

(51) Int. Cl.
*G06F 19/00* (2006.01)
*G01R 19/00* (2006.01)

(52) U.S. Cl. ............... 702/64; 702/57; 702/60; 702/65; 702/99; 702/104; 702/130; 374/1; 374/2; 374/16; 374/19; 374/170; 374/171; 374/172; 374/173; 374/178; 324/713; 323/906; 136/252

(58) Field of Classification Search .............. 702/57, 702/60, 64, 65, 97, 104, 130; 374/1, 2, 16, 374/19, 170–173, 178; 324/713; 136/252
See application file for complete search history.

(56) References Cited

U.S. PATENT DOCUMENTS

| 6,111,767 | A | 8/2000 | Handleman |
| 6,545,211 | B1* | 4/2003 | Mimura ..................... 136/244 |
| 7,256,566 | B2 | 8/2007 | Bhavaraju et al. |
| 2005/0172995 | A1 | 8/2005 | Rohrig et al. |
| 2007/0119718 | A1 | 5/2007 | Gibson et al. |
| 2007/0221267 | A1 | 9/2007 | Fornage |
| 2008/0143554 | A1 | 6/2008 | Green et al. |

OTHER PUBLICATIONS

"General Description of Aluminum Electrolytic Capacitors", 28 pages, Nichicon Corporation. Downloaded from http://nichicon-us.com/english/products/pdf/aluminum.pdf.
"Reliability of CDE Aluminum Electrolytic Capacitors", Cornell Dubilier, written by Sam G. Parler, Jr., P.E., 10 pages. Downloaded from http://www.cde.com/tech/reliability.pdf.
"Deriving Life Multipliers for Electrolytic Capacitors", Cornell Dubilier, written by Sam G. Parler, Jr., P.E., 3 pages. Downloaded from http://www.cde.com/tech/multipliers.pdf.
International Search Report and Written Opinion mailed 26 May 2010 for PCT Application No. PCT/US2009/061021.

* cited by examiner

*Primary Examiner* — Sujoy K Kundu
(74) *Attorney, Agent, or Firm* — Moser IP Law Group

(57) ABSTRACT

A method and apparatus for determining an operating voltage lower bound for preventing photovoltaic (PV) cell reverse breakdown during power conversion. The method comprises determining a PV cell operating temperature; computing, at a controller, an operating voltage corresponding to a maximum power point (MPP) based on the PV cell operating temperature; and determining, at the controller, an operating voltage lower bound based on the operating voltage.

20 Claims, 4 Drawing Sheets

METHOD AND APPARATUS FOR DETERMINING AN OPERATING VOLTAGE FOR PREVENTING PHOTOVOLTAIC CELL REVERSE BREAKDOWN DURING POWER CONVERSION

CROSS-REFERENCE TO RELATED APPLICATIONS

This application claims benefit of U.S. provisional patent application Ser. No. 61/196,253, filed Oct. 16, 2008, which is herein incorporated in its entirety by reference.

BACKGROUND OF THE INVENTION

1. Field of the Invention

Embodiments of the present disclosure generally relate to power conversion and, more particularly, to preventing photovoltaic cell reverse breakdown during power conversion.

2. Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

PV modules generally comprise one or more sets of PV cells connected in series for generating DC current from received solar irradiance. Each series-connected PV cell shares the same current, where the current at a given voltage is roughly proportional to the solar irradiance received by the PV cell. Under some conditions, one or more PV cells may become partially-shaded and unable to pass the global current produced by other PV cells within the set unless the shaded PV cell is forced into reverse breakdown. During such operation, the partially-shaded PV cell must dissipate a large amount of power, possibly leading to increasing temperatures at "hot spots" within the PV cell and potentially destroying the PV cell. Bypass diodes are typically utilized to protect the PV cells from such damage; however, the use of bypass diodes increases the number of components and connections required for operating a PV module.

Therefore, there is a need in the art for a method and apparatus for preventing PV cell reverse breakdown during power conversion.

SUMMARY OF THE INVENTION

Embodiments of the present invention generally relate to a method and apparatus for determining an operating voltage lower bound for preventing photovoltaic (PV) cell reverse breakdown during power conversion. The method comprises determining a PV cell operating temperature; computing, at a controller, an operating voltage corresponding to a maximum power point (MPP) based on the PV cell operating temperature; and determining, at the controller, an operating voltage lower bound based on the operating voltage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
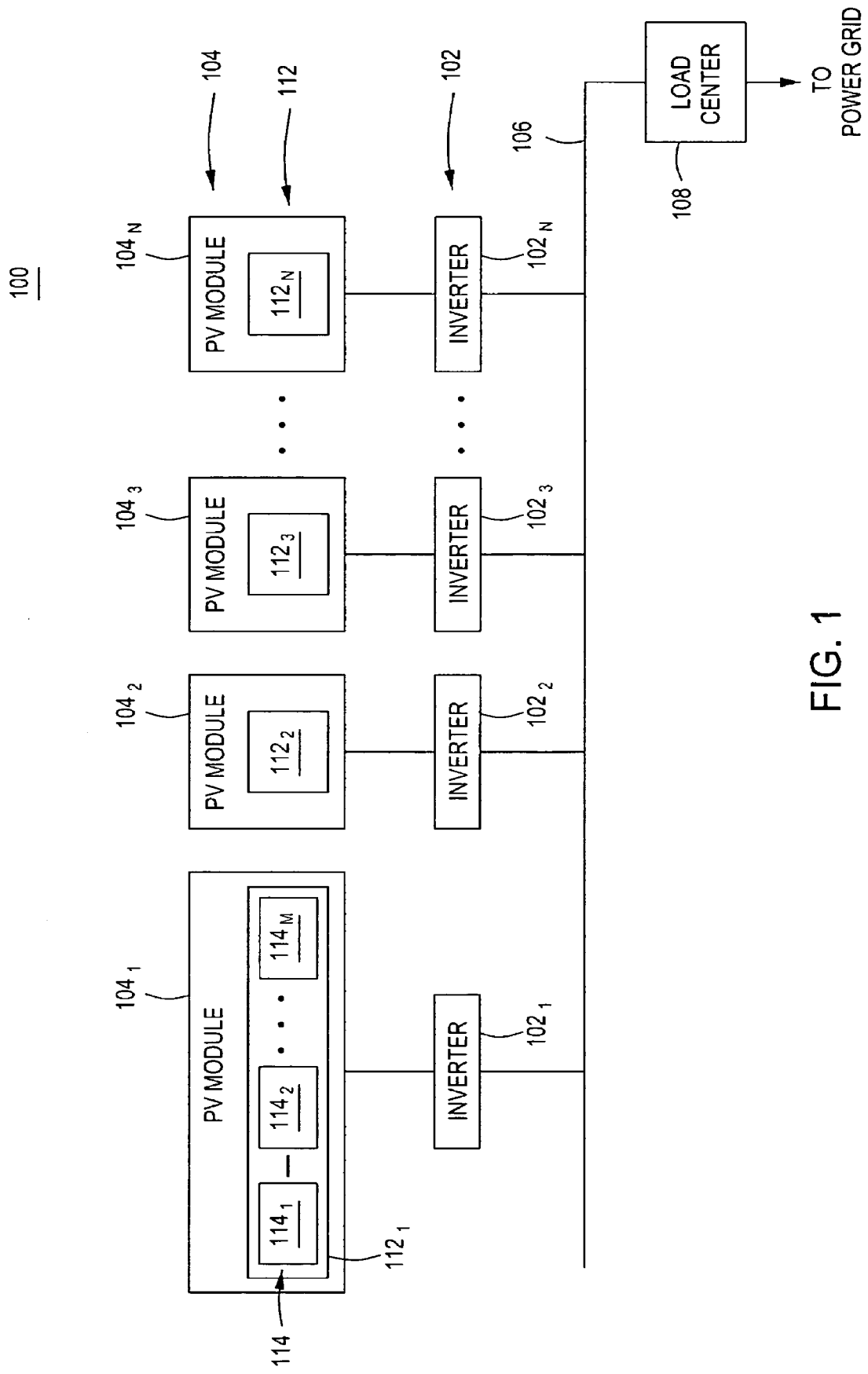
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ ... $102_n$, collectively referred to as inverters 102, a plurality of PV modules $104_1$, $104_2$ ... $104_n$, collectively referred to as PV modules 104, an AC bus 106, and a load center 108.

Each inverter $102_1$, $102_2$ ... $102_n$ is coupled to a PV module $104_1$, $104_2$ ..., $104_n$, respectively, for inverting DC current from the PV modules 104 to AC current. Generally, each PV module $104_1$, $104_2$ ... $104_n$ comprises at least one set of PV cells $112_1$, $112_2$ ... $112_n$, respectively. Each set of PV cells $112_1$, $112_2$ ... $112_n$, collectively referred to as sets of PV cells 112, comprises a plurality of PV cells $114_1$, $114_2$ ... $114_m$, collectively referred to as PV cells 114, where the PV cells 114 are coupled in series for generating DC current from received solar irradiance. The number of PV cells 114 within a set of PV cells 112 may vary; additionally, the number of sets of PV cells 112 within each PV module 114 may vary.

In some embodiments, a DC/DC converter may be coupled between each PV module 104 and each inverter 102 (e.g., one converter per PV module 104). Alternatively, multiple PV modules 104 may be coupled to a single inverter 102 (i.e., a centralized inverter), and, in some such embodiments, a DC/DC converter may be coupled between the PV modules 104 and the centralized inverter.

Each inverter 102 employs a maximum power point tracking (MPPT) technique to operate the subtending PV module 104 at its maximum power point (MPP) such that the PV module 104 generates an optimal power output for a given temperature and solar irradiation. The inverters 102 are coupled to the AC bus 106, which in turn is coupled to the load center 108. The load center 108 houses connections between incoming power lines from a commercial power grid distribution system and the AC bus 106. The inverters 102 convert DC power generated by the PV modules 104 into AC power, and meter out AC current that is in-phase with the AC commercial power grid voltage. The system 100 couples the generated AC power to the commercial power grid via the load center 108.

In accordance with one or more embodiments of the present invention, the inverters 102 employ a "reverse bias prevention" technique, as described in detail below, for preventing reverse breakdown of the PV cells during power conversion. The reverse bias prevention technique restricts the operating voltage of the PV modules 104 in order to prevent one or more of the PV cells from becoming reverse biased, for example in the event that one or more of the PV cells becomes partially-shaded and cannot pass a current generated by the remaining PV cells unless it is forced into reverse breakdown. In some alternative embodiments, such a reverse bias prevention technique may be utilized by a DC/DC converter during DC/DC power conversion from one or more PV modules 104.

Figure 2:
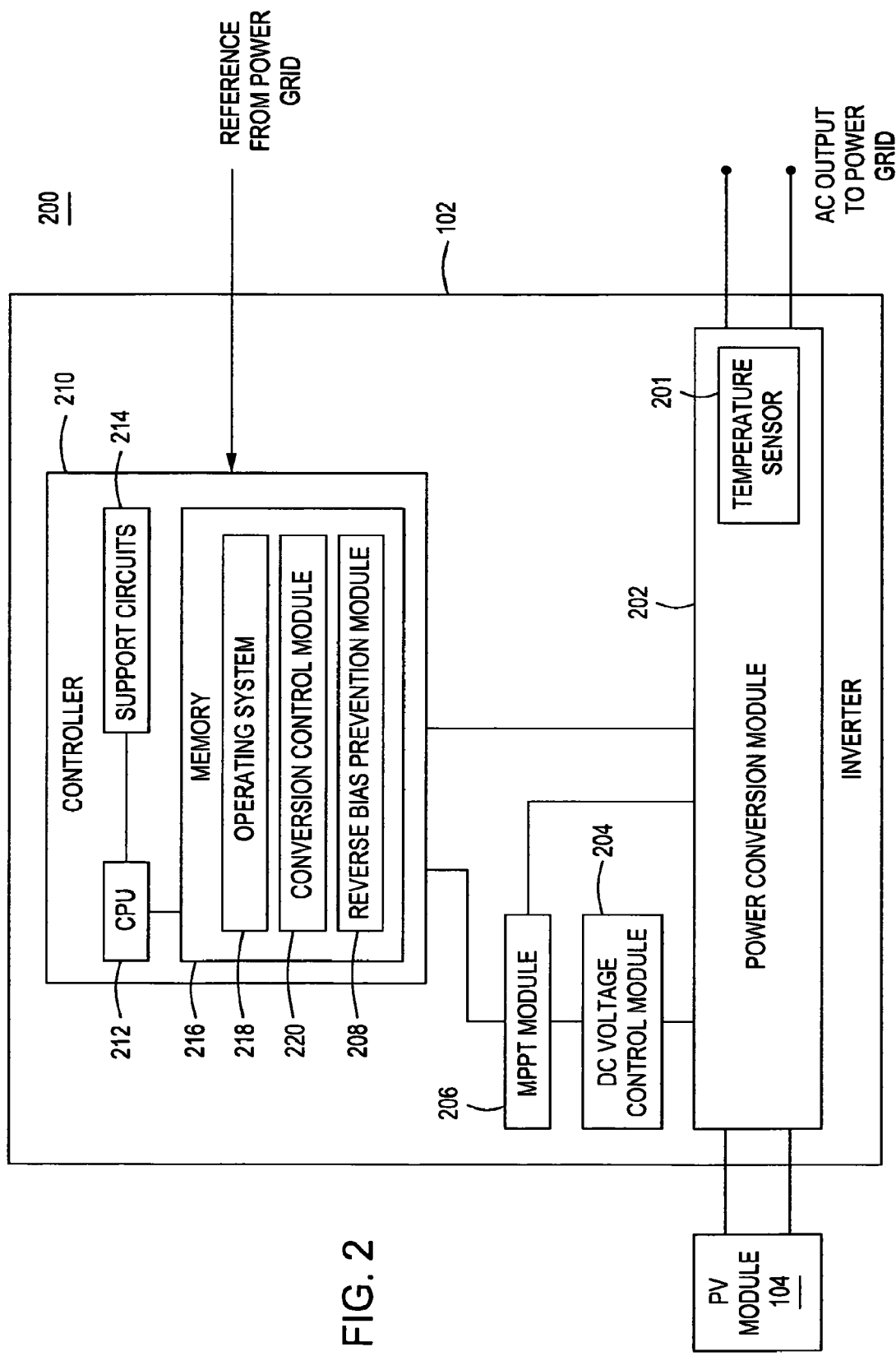
FIG. 2 is a block diagram of an inverter in accordance with one or more embodiments of the present invention.

FIG. 2 is a block diagram of an inverter 102 in accordance with one or more embodiments of the present invention. The inverter 102 comprises a power conversion module 202, a DC voltage control module 204, an MPPT module 206, and a controller 210. The inverter 102 is coupled to the PV module 104 and to the commercial power grid.

The power conversion module 202 is coupled via two input terminals to the PV module 104 and via two output terminals to the commercial power grid, and acts to convert a DC current from the PV module 104 to an AC current. The power conversion module 202 is further coupled to the DC voltage control module 204, the MPPT module 206, and the controller 210, for operational control. Additionally, the DC voltage control module 204 is coupled to the MPPT module 206, and the MPPT module 206 is coupled to the controller 210.

The DC voltage control module 204 functions to bias the PV module 104 at a DC voltage set point (i.e., a desired PV module operating voltage) by driving the power conversion module 202 to generate a required AC output current, thereby modulating the current drawn from the PV module 104 and inherently setting the PV module operating voltage. The MPPT module 206 provides a means for generating the DC voltage set point such that it corresponds to a voltage at the MPP (i.e., an MPP voltage).

The controller 210 receives a reference signal from the commercial power grid, and provides the control signals for the power conversion module 202 to convert the received DC current to the required AC output current. One example of such power conversion is commonly assigned U.S. Patent Application Publication Number 2007/0221267 entitled "Method and Apparatus for Converting Direct Current to Alternating Current" and filed Mar. 20, 2007, which is herein incorporated in its entirety by reference. The resulting AC output current is coupled to the commercial power grid such that it is in-phase with the commercial AC current.

The controller 210 comprises at least one central processing unit (CPU) 212, which is coupled to support circuits 214 and to a memory 216. The CPU 212 may comprise one or more conventionally available microprocessors or digital signal processors (DSPs); additionally or alternatively, the CPU 212 may include one or more application specific integrated circuits (ASICs). The support circuits 214 are well known circuits used to promote functionality of the CPU 212. Such circuits include, but are not limited to, a cache, power supplies, clock circuits, buses, network cards, input/output (I/O) circuits, and the like.

The memory 216 may comprise random access memory, read only memory, removable disk memory, flash memory, and various combinations of these types of memory. The memory 216 is sometimes referred to as main memory and may, in part, be used as cache memory or buffer memory. The memory 216 generally stores the operating system (OS) 218 of the controller 218. The OS 218 may be one of a number of commercially available operating systems such as, but not limited to, Linux, Real-Time Operating System (RTOS), and the like.

The memory 216 may store various forms of application software, such as a conversion control module 220 for controlling the operation of the power conversion circuit 202. In accordance with one or more embodiments of the present invention, the memory 216 may store a reverse bias prevention module 208 for providing a means for preventing PV cell reverse breakdown; for example, the reverse bias prevention module 208 may determine an operating voltage range for the PV module 104 such that one or more partially-shaded PV cells cannot be forced into reverse breakdown, as described below. The operating voltage range is then provided to the MPPT module 206 to ensure that the PV module 104 is operated within the range. In some embodiments, the conversion control module 220 and/or the reverse bias prevention module 208, or portions thereof, may be implemented in software, firmware, hardware, or a combination thereof. In some alternative embodiments, the reverse bias prevention module 208 may be located externally to the inverter 102.

In some embodiments, the reverse bias prevention module 208 may determine the PV module operating voltage range as follows. The power conversion module 202 may comprise a temperature sensor 201 for determining an ambient temperature, $T_a$; alternatively, the temperature sensor 201 may be a separate element within the inverter 102 or located externally to the inverter 102. The power conversion module 202 provides a signal indicative of the ambient temperature $T_a$ to the reverse bias prevention module 208. The reverse bias prevention module 208 may then estimate a PV cell operating temperature $T_c$ by adjusting the ambient temperature $T_a$ to account for temperature elevation of the PV cell due to irradiance induced self-heating. Such a temperature elevation is approximately proportional to the irradiance received by the PV cell during normal (i.e., unshaded) operating conditions at a nominal PV cell operating temperature, and, therefore, to an MPP current $I_{mp}$ drawn from the PV module 104 during such conditions. Thus, the PV cell operating temperature $T_c$ can be estimated as follows:

$$T_c = T_a + K^* I_{mp} \quad (1)$$

where K is a predetermined factor and $I_{mp}$ is an estimated current drawn from the PV module 104 that corresponds to an MPP under normal (i.e., unshaded) operating conditions at a nominal PV cell operating temperature (i.e., $I_{mp}$ is a nominal MPP current of the PV module 104). In some embodiments, $I_{mp}$ may be supplied by a manufacturer of the PV module 104 and estimates the PV module current corresponding to an MPP for a PV cell operating temperature of 25° C. In some alternative embodiments, the power conversion module 202 may utilize an internal temperature elevation module, e.g., an internal temperature elevation module that is proportional to processed power, and provide a signal indicative of $T_c$ directly to the reverse bias prevention module 208.

The reverse bias prevention module 208 utilizes the estimated $T_c$ to estimate an operating voltage, $V_{pv}$, of the PV module 104 that corresponds to an MPP under normal (i.e., unshaded) operating conditions at the current PV cell operating temperature (i.e., $V_{pv}$ is an MPP operating voltage of the PV module 104). The estimated MPP operating voltage $V_{pv}$ is based on the estimated PV cell operating temperature $T_c$, along with an estimate of a an operating voltage, $V_{mp}$, for the PV module 104 that corresponds to the MPP under normal (i.e., unshaded) operating conditions at a nominal PV cell operating temperature (i.e., $V_{mp}$ is a nominal MPP operating voltage of the PV module 104). In some embodiments, $V_{pv}$ may be estimated as follows:

$$V_{pv} = V_{mp} * (1 - \lambda(T_c - 25)) \quad (2)$$

where $\lambda$ is a temperature coefficient (e.g., $\lambda = 0.00341/°$ C.), and $V_{mp}$ is the estimated nominal MPP operating voltage at a PV cell operating temperature of 25° C., for example, as supplied by a manufacturer of the PV module 104.

The reverse bias prevention module 208 utilizes the estimated $V_{pv}$ to determine a desired operating voltage range for PV module 104 as follows:

$$V_{pv} - V_{br} < V_{op} < V_{max} \quad (3)$$

where $V_{op}$ is an operating voltage of the PV module 104, $V_{br}$ is a breakdown voltage of a PV cell (generally between 10V to 30V), and $V_{max}$ is a maximum desired operating voltage of the PV module 104. The lower bound of the operating voltage range, $V_{pv} - V_{br}$, ensures that the PV module 104 is operated above an MPP voltage corresponding to a reverse breakdown of any partially-shaded PV cells, as shown below with respect to FIG. 3. The reverse bias prevention module 208 provides the operating voltage range to the MPPT module 206, and the MPPT module 206 drives the DC voltage set point such that the PV module 104 is operated within the operating voltage range.

In some instances, the PV module output power may increase when the PV module is operated proximate the lower bound of the operating voltage range (i.e., $V_{op} \sim V_{pv} - V_{br}$) due to the existence of a reverse breakdown MPP for a PV module operating with one or more partially shaded PV cells. Such a reverse breakdown MPP exists at a voltage below $V_{pv} - V_{br}$ and is described below with respect to FIG. 3. In order to ensure that the PV module 104 operates proximate the appropriate MPP, the MPPT module 206 provides a means for detecting such a power increase at the lower bound of the operating voltage range and restarts the DC voltage set point at or near the upper bound of the operating voltage range (i.e., $V_{max}$). The resetting of the DC voltage set point ensures that the PV module operating voltage is driven toward the appropriate MPP within the desired PV module operating voltage range.

Figure 3:
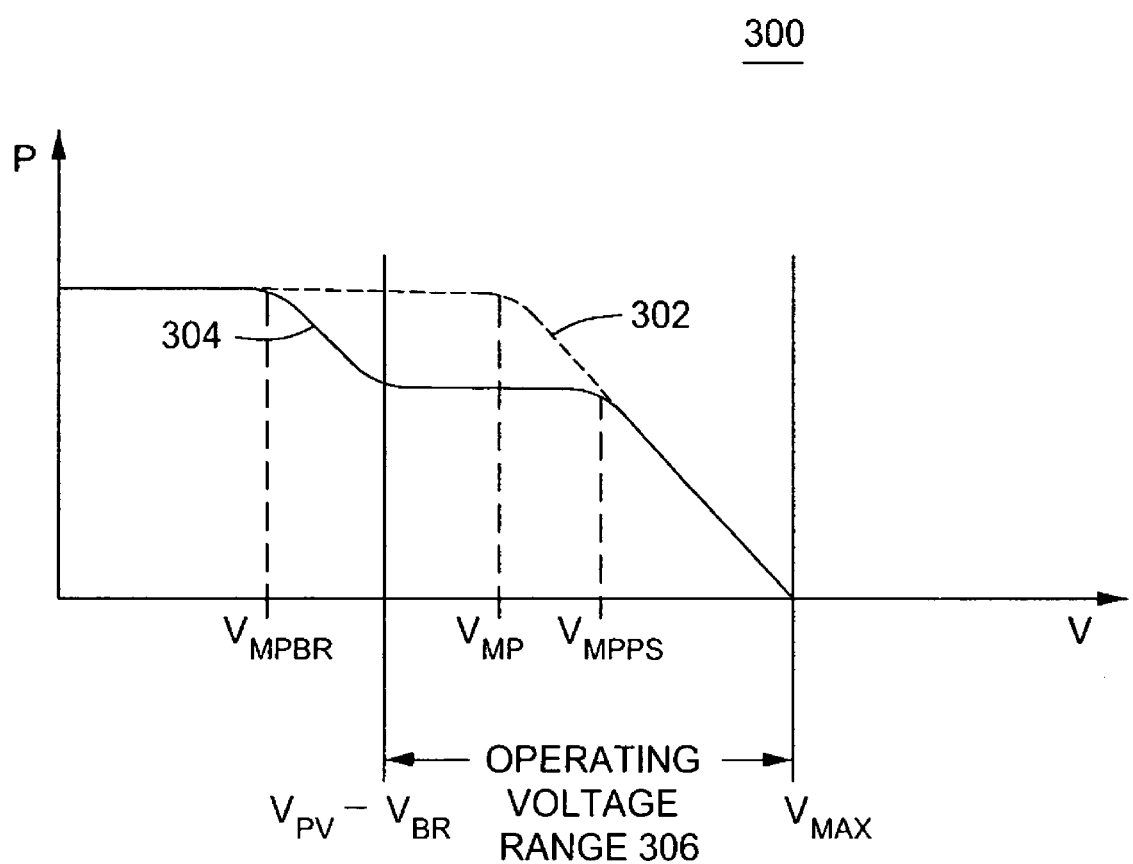
FIG. 3 is a graphical representation of a desired PV module operating voltage range in accordance with one or more embodiments of the present invention.

FIG. 3 is a graphical representation 300 of a desired PV module operating voltage range 306 in accordance with one or more embodiments of the present invention. FIG. 3 depicts a Power-Voltage (P-V) curve 302 for a PV module 104 operating during normal, unshaded operating conditions, and a P-V curve 304 of a PV module 104 operating with a partially-shaded PV cell.

The P-V curve 302 comprises a single MPP at the voltage $V_{mp}$. The PV curve 304 comprises two MPPs, a first at the voltage $V_{mpbr}$ and a second at the voltage $V_{mpps}$. At the first MPP voltage $V_{mpbr}$ on the P-V curve 304, i.e., a reverse breakdown MPP, the partially-shaded PV cell operates in reverse breakdown, allowing the remaining PV cells within the PV module 104 to push their regular current through the partially-shaded cell. The voltage $V_{mpbr}$ can be estimated as $V_{mpbr} = V_{mp} - V_{br}$. The second MPP voltage $V_{mpps}$ on the P-V curve 304 corresponds to a much lower current passing through the partially-shaded cell and therefore represents a safe operating point for the partially-shaded cell.

In order to prevent the PV module 104 from being operated at $V_{mpbr}$, the desired operating voltage range 306 is calculated to range from a lower bound of $V_{pv} - V_{br}$, which is above the reverse breakdown MPP voltage $V_{mpbr}$, to an upper bound of $V_{max}$, where $V_{max}$ is a maximum operating voltage of the PV module 104. The desired operating voltage range 306 is then utilized to limit the actual operating voltage of the PV module 104 as described above in relation to FIG. 2.

Figure 4:
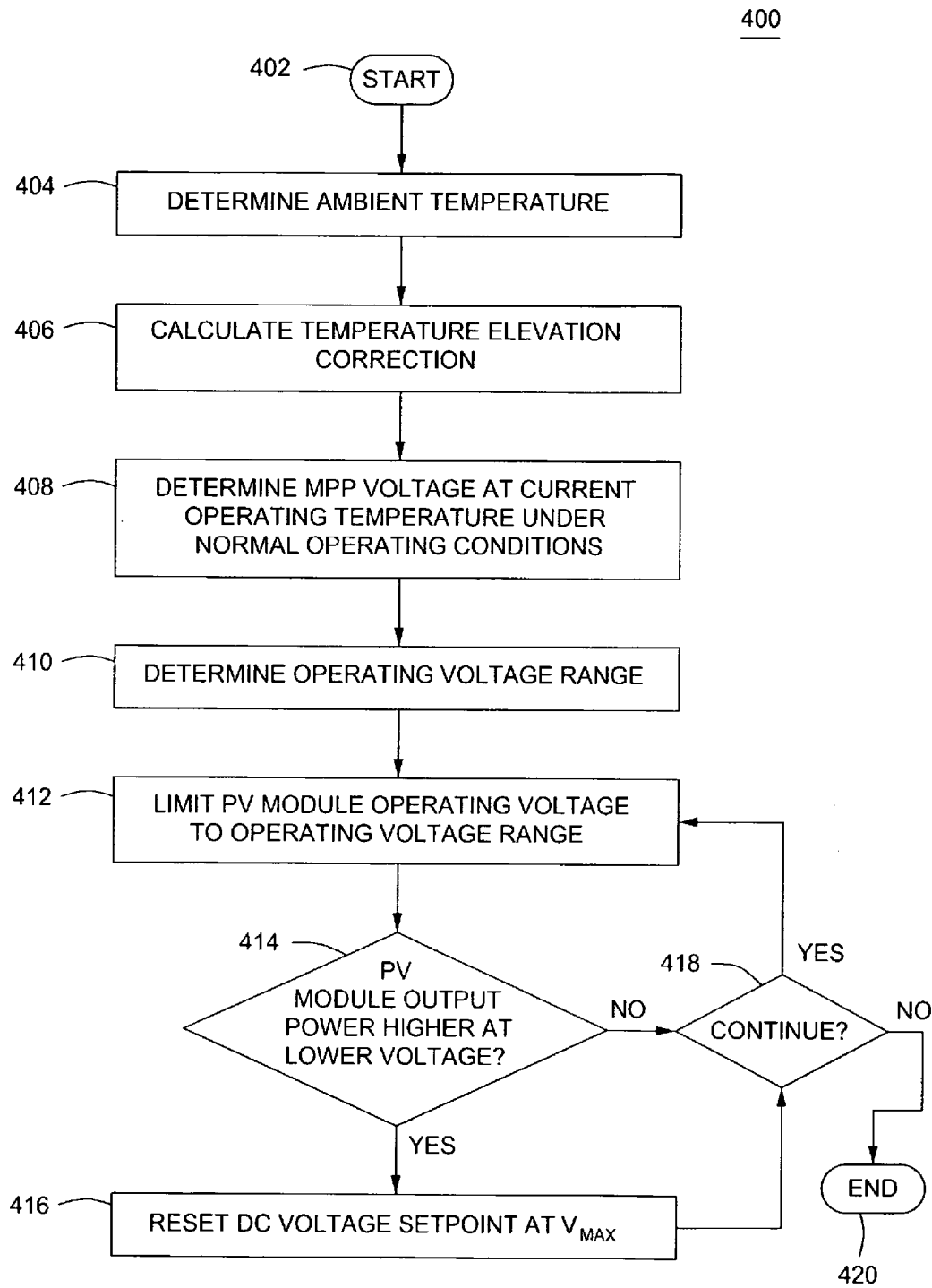
FIG. 4 is a flow diagram of a method for determining a desired PV module operating voltage range in accordance with one or more embodiments of the present invention.

FIG. 4 is a flow diagram of a method 400 for determining a desired PV module operating voltage range in accordance with one or more embodiments of the present invention. In the method 400, an inverter is coupled to a PV module for converting DC power generated by the PV module to AC power, where the PV module comprises one or more partially-shaded PV cells. The inverter is further coupled to a commercial power grid such that the AC power produced is coupled to the grid in-phase with the commercial AC power. In some embodiments, multiple PV modules may be coupled to a single centralized inverter; alternatively, individual PV modules may be coupled to individual inverters (e.g., one PV module per inverter). In some embodiments, a DC/DC converter may be coupled between the PV module or PV modules and the inverter. The method 400 may be employed during either DC/DC or DC/AC power conversion of the DC power generated from one or more PV modules.

The method 400 begins at step 402 and proceeds to step 404. At step 404, an ambient temperature $T_a$ is determined; in some embodiments, a temperature sensor determines the ambient temperature $T_a$, where the temperature sensor may be located internal or external to the inverter. At step 406, a PV cell operating temperature $T_c$ is estimated by adjusting the ambient temperature $T_a$ to account for temperature elevation of the PV cell due to irradiance induced self-heating. In some embodiments, $T_c = T_a + K * I_{mp}$, where K is a predetermined factor and $I_{mp}$ is an estimated nominal MPP current of the PV module 104, i.e., an estimated PV module current corresponding to an MPP under normal (i.e., unshaded) operating conditions at a nominal temperature (e.g., 25° C.). In some embodiments, the estimated nominal MPP current $I_{mp}$ may be supplied by a manufacturer of the PV module. The estimated PV cell operating temperature $T_c$ may be computed at a controller, for example a controller of the inverter; alternatively, the inverter may utilize an internal temperature elevation module for determining the estimated PV cell operating temperature $T_c$, for example, based on processed power.

The method 400 proceeds to step 408, where a PV module operating voltage $V_{pv}$ to achieve an MPP under normal (i.e., unshaded) operating conditions at the current PV cell operating temperature is determined. In some embodiments, such an MPP operating voltage $V_{pv}$ is estimated as $V_{pv} = V_{mp} * (1 - \lambda(T_c - 25))$, where $V_{mp}$ is an estimated operating voltage of the PV module that corresponds to the MPP under normal (i.e., unshaded) operating conditions at a nominal PV cell operating temperature of 25° C., and $\lambda$ is a temperature coefficient. In some embodiments, $\lambda = 0.00341°$ C.; additionally, $V_{mp}$ may be supplied by the PV module manufacturer.

The method 400 proceeds to step 410, where an operating voltage range for the PV module is determined such that the partially-shaded PV cells will not be forced into reverse breakdown. In some embodiments, the operating voltage range is determined to be $V_{pv} - V_{br} < V_{op} < V_{max}$, where $V_{op}$ is an operating voltage of the PV module, $V_{br}$ is a breakdown voltage of a PV cell (generally between 10V to 30V), and $V_{max}$ is a maximum desired operating voltage. The lower bound of the operating voltage range, $V_{pv} - V_{br}$, ensures that the PV module is operated above a reverse breakdown MPP voltage at which the partially-shaded PV cells are forced into reverse breakdown. At step 412, the PV module operating voltage is limited to the operating voltage range; i.e., an MPPT technique determines a DC voltage set point for the PV module within the operating voltage range. The PV module is then driven to operate at the DC voltage set point.

The method 400 proceeds to step 414, where a determination is made as to whether the PV module output power is increasing when the PV module is operating proximate the lower bound of the operating voltage range. If the result of such determination is yes, the method 400 proceeds to step 416; if the result of such determination is no, the method 400 proceeds to step 418.

At step 416, the DC voltage set point for the PV module is reset at or near the upper bound of the operating voltage range (i.e., $V_{max}$), and the PV module is driven to operate at such DC voltage set point. The resetting of the DC voltage set point ensures that the PV module is operated proximate an MPP within the operating voltage range. The method 400 proceeds to step 418, where a determination is made as to whether to continue operating. If the result of such determination is yes, the method 400 returns to step 412. If the result of such determination is no, the method 400 proceeds to step 420, where it ends.

While the foregoing is directed to embodiments of the present invention, other and further embodiments of the invention may be devised without departing from the basic scope thereof, and the scope thereof is determined by the claims that follow.

The invention claimed is:

1. A method for determining an operating voltage lower bound for preventing photovoltaic (PV) cell reverse breakdown during power conversion, comprising:
   determining a PV cell operating temperature;
   computing, at a controller, an operating voltage corresponding to a maximum power point (MPP) based on the PV cell operating temperature; and
   determining, at the controller, an operating voltage lower bound based on the operating voltage.

2. The method of claim 1, wherein the operating voltage is further based on a nominal operating voltage corresponding to an MPP during unshaded operating conditions of a PV module at a nominal PV cell operating temperature.

3. The method of claim 1, wherein determining the PV cell operating temperature comprises:
   obtaining an ambient temperature; and
   computing, at the controller, the PV cell operating temperature based on the ambient temperature and a current corresponding to an MPP.

4. The method of claim 3, wherein the current corresponds to an MPP during unshaded operating conditions of a PV module at a nominal PV cell operating temperature.

5. The method of claim 1, further comprising limiting an actual operating voltage based on the operating voltage lower bound.

6. The method of claim 1, wherein the operating voltage lower bound is greater than a voltage corresponding to an MPP at which a PV cell reverse breakdown occurs.

7. The method of claim 1 further comprising:
   determining an increase in output power during operation of a PV module proximate the operating voltage lower bound; and
   setting a DC voltage set point for the PV module proximate an operating voltage upper bound in response to determining the increase.

8. Apparatus for determining an operating voltage lower bound for preventing photovoltaic (PV) cell reverse breakdown during power conversion, comprising:
   a reverse bias prevention module for (i) determining a PV cell operating temperature, (ii) computing an operating voltage corresponding to a maximum power point (MPP) based on the PV cell operating temperature, and (iii) determining an operating voltage lower bound based on the operating voltage.

9. The apparatus of claim 8, wherein the operating voltage is further based on a nominal operating voltage corresponding to an MPP during unshaded operation of a PV module at a nominal PV cell operating temperature.

10. The apparatus of claim 8, wherein determining the PV cell operating temperature comprises (i) obtaining an ambient temperature, and (ii) computing the PV cell operating temperature based on the ambient temperature and a current corresponding to an MPP.

11. The apparatus of claim 10, wherein the current corresponds to an MPP during unshaded operating conditions of a PV module at a nominal PV cell operating temperature.

12. The apparatus of claim 8, wherein the reverse bias prevention module generates an indication of the operating voltage lower bound for operating a PV module above the operating voltage lower bound.

13. The apparatus of claim 8, wherein the operating voltage lower bound is greater than a voltage corresponding to an MPP at which a PV cell reverse breakdown occurs.

14. Apparatus for determining an operating voltage lower bound for preventing photovoltaic (PV) cell reverse breakdown during power conversion, comprising:
   means for determining a PV cell operating temperature;
   means for computing an operating voltage corresponding to a maximum power point (MPP) based on the PV cell operating temperature; and
   means for determining an operating voltage lower bound based on the operating voltage.

15. The apparatus of claim 14, wherein the operating voltage is further based on a nominal operating voltage corresponding to an MPP during unshaded operation of a PV module at a nominal PV cell operating temperature.

16. The apparatus of claim 14, further comprising means for obtaining an ambient temperature, wherein determining the PV cell operating temperature comprises computing the PV cell operating temperature based on the ambient temperature and a current corresponding to an MPP.

17. The apparatus of claim 16, wherein the current corresponds to an MPP during unshaded operating conditions of a PV module at a nominal PV cell operating temperature.

18. The apparatus of claim 14, further means for generating a DC voltage set point for a PV module, the DC voltage set point above the operating voltage lower bound.

19. The apparatus of claim 14, wherein the operating voltage lower bound is greater than a voltage corresponding to an MPP at which a PV cell reverse breakdown occurs.

20. The apparatus of claim 18, further comprising means for determining an increase in output power during operation of a PV module proximate the operating voltage lower bound, wherein the means for generating the DC voltage set point generates the DC voltage set point proximate an operating voltage upper bound in response to determining the increase.

* * * * *